Jan. 23, 1923.

J. H. DALBEY.
RESILIENT FILLER FOR TIRES.
FILED FEB. 6, 1922.

1,443,069

Witnesses:
Harry C. White
W. H. Kilroy

Inventor:
James H. Dalbey.
By Murray Lotz & Wilson
Attys.

Patented Jan. 23, 1923.

1,443,069

UNITED STATES PATENT OFFICE.

JAMES H. DALBEY, OF ELGIN, ILLINOIS.

RESILIENT FILLER FOR TIRES.

Application filed February 6, 1922. Serial No. 534,295.

*To all whom it may concern:*

Be it known that I, JAMES H. DALBEY, a citizen of the United States, and resident of Elgin, in the county of Kane and State of Illinois, have invented certain new and useful Improvements in a Resilient Filler for Tires, of which the following is a specification.

My invention relates to improvements in fillers for yielding tires for vehicles, the object being to provide a filler which shall, under use, assume a predetermined form for best supporting the imposed load.

The fillers of my invention are especially adapted for use in place of or in lieu of the well known pneumatic tubes in pneumatic tires for automobiles.

This present invention is an improvement upon my earlier invention described and claimed in United States Patent No. 1,351,894, issued to me September 7, 1920.

Pneumatic tires and especially the casing for such tires are so formed and constructed that when the air pressure in the tire is properly proportioned to the load, the distortion of the road contacting portion of the tire is suitably proportioned to the size of the tire to attain the best results in cushioning and wearing qualities.

In replacing the air tube with a filler of spongy rubber, it is desirable as a final result, to retain the form of cross section at the contacting part of the tire under the load as originally designed. It will be understood that at the time a rubber sponge filler is placed in a casing it is designed to be compressed in the casing to a pressure substantially the same as would be used with air in a similar casing. It will be understood that under load, that is in use, the casing and filler are more or less distorted, being of course shortened radially and thickened transversely. I find that the rubber sponge filler does not fully return to its original shape after being deformed under pressure, and when the filler is made accurately of the shape of the pneumatic casing at the start, it will, under operating conditions, become flattened at its outer periphery. I find that this flattening down practically reaches a limit or comes to a standstill at about ten percent reduction of the radial depth of the filler. To overcome this objection and to provide a tire which will, under working conditions, finally result in a shape best adapted to the conditions of operation, I have conceived the idea of making the filler originally of a shape which will allow it to be formed inwardly by the operating road pressure in practical use, the amount which I have found this effect to be and so that when this occurs the filler and casing will finally be the desired shape.

Instead of making the filler of substantially circular cross-section to fit within the casing, I elongate it radially, making it of substantially equal cross-sectional area but of a different shape. As the elongation is reduced in use, the transverse width is increased until finally it is substantially circular in section in its permanent load bearing form. At this time, the filler still retains nearly if not fully, its original elasticity and the casing is maintained in substantially its true circular cross-sectional form. In the above discussion of my invention I have considered the main portion of the filler, not the inner part which extends between the beaded edges of the casing, such inner part obviously conforming with the space between the inner edges of the casing.

For a complete understanding of my invention reference is made to the accompanying drawings forming part of this specification, and in which:—

Figure 1:
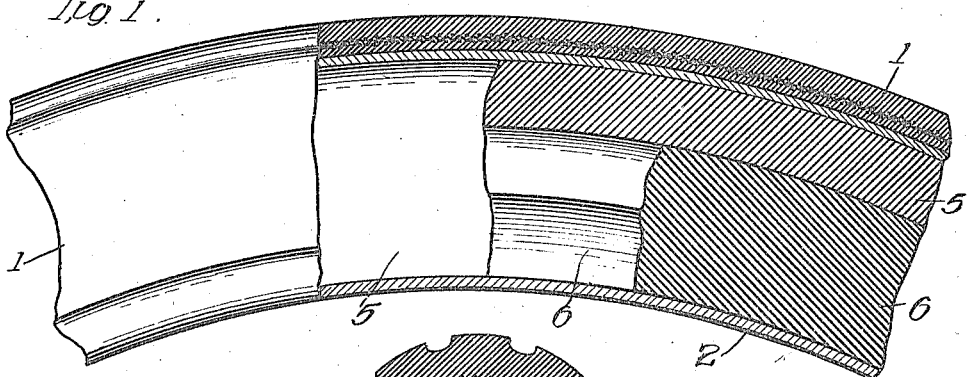
Figure 1 is a fragmentary side elevation of a tire shown partly in section and made in accordance with my invention.
Figure 2:
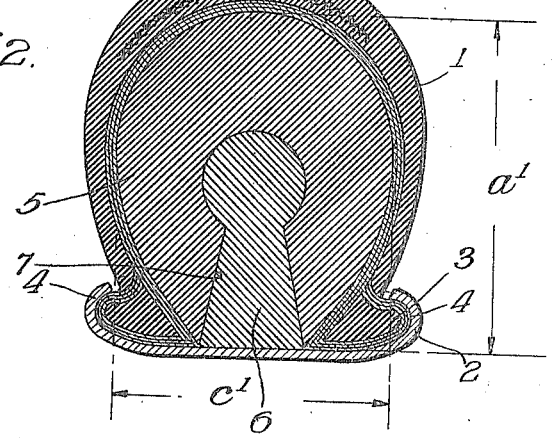
Figure 2 is a radial cross-section of the tire shown mounted on a rim and in its final or working condition.

In said drawings 1 illustrates a tire casing such as is in common use for pneumatic tires. The form shown is of the clincher type and in Figures 1 and 2 is shown as mounted upon a clincher rim 2, the tire being provided with base beads 3 fitting within the hooked flanges 4 of the rim. It will be obvious that my invention is equally useful in connection with other forms of casings and rims.

In Figure 2 I have shown the casing 1 in its normal shape such as it would be held in, if an inner tube were used with the proper amount of air pressure within the tube. My improved filler comprises a spongy rubber ring 5 and a wedge ring 6 of the same material. Preferably as shown and described, in my said patent, the main portion 5 of the filler is provided with a slot 7 at its inner periphery for receiving the wedging member 6. The two parts together are so proportioned as to cross sectional area that when they are inclosed in the casing and the casing is properly mounted on the rim, the casing will be held distended with substantially the same pressure as though it were provided with a pneumatic tube and the proper air pressure was held within the tube.

As explained hereinbefore, the spongy rubber of which the filler is composed is compressed under road pressure and does not have sufficient resiliency in its form as originally made and mounted in the casing to regain its original shape.

However, I have discovered that there is a limit to this permanent distortion and after use upon the road of two or three thousand miles the distortion of the filler reaches this limit. After this limit has been reached, the normal distortion of the part in contact with the ground is overcome during the revolution of the tire and the cross-sectional shape, of the filler and consequently of the tire, is substantially permanent, the incidental compression of the filler at the point of road contact being merely temporary.

Figure 3:
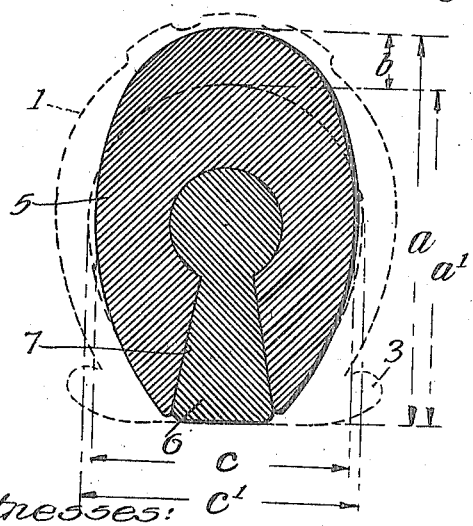
Figure 3 is a radial section of the tire filler, showing in full lines its form when first inserted in the casing and in dotted lines in its form after it has reached its final form by use on the road.
Figure 4:
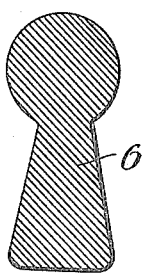
Figure 4 is a detail cross-sectional view of the wedge or key-lock portion of the filler.

In order to have the tire in what might be termed its true normal shape after the filler has thus been formed by road use, I make the filler of larger dimensions radially to begin with than I desire it to be permanently. In other words, the radial dimension $a$ Figure 3 is greater than the radial dimension $a'$ Figure 3 by the amount $b$ Figure 3 which the filler is compressed in use. Likewise, the transverse dimension $c$ of the filler Figure 3 is less than the final transverse dimension $c$ Figure 3 of the filler in its final form. The cross-sectional area of the filler is substantially the same at all times but its shape is varied from original form to its final form.

I have found that with allowing substantially one-tenth decrease in the radial dimension of the filler, I am enabled to attain the result of a filler and casing of normal dimensions and avoid a final flattening of the tire which has been the common condition of such filled tires where the filler was originally produced in conformity with the normal shape and size of the casing.

While it is possible that other modifications of my invention will be suggested to those skilled in the art, I do not limit or confine my invention to the specific form and construction of filler herein shown and described.

I claim:

1. A yielding resilient filler for a tire casing, having a normal shape for use, the filler having original dimensions greater radially and less transversely than the normal inside dimensions of the casing and adapted in use to be reduced radially and enlarged transversely, as and for the purpose specified.

2. A yielding resilient filler for a tire casing, the filler adapted to be enclosed within a casing under a pressure substantially the same as though the casing were used with a pneumatic tube, the filler being of a larger radial dimension and a smaller transverse dimension than the similar normal inside dimensions of the casing and adapted in use to be reduced in its radial dimension and increased in its transverse dimension to cause the casing to finally assume its normal shape.

3. In a yielding resilient filler for tire casings, a main ring-like filler having a slot at its inner edge in combination with a wedging member adapted to be inserted in the slot, the two parts composing a filler of suitable cross-sectional area in relation to a casing in which it is to be used to produce a suitable sustaining pressure within the casing when the casing is mounted upon a rim, the filler being formed originally of larger radial depth than the normal radial depth of the casing and of less overall transverse dimension than the similar dimension of the casing, the filler adapted to be reduced radially and increased transversely under use on the road to a final form so that the casing is finally held in its normal shape.

Signed at Chicago, Illinois, this 2nd day of February, 1922.

JAMES H. DALBEY.